United States Patent [19]

Saito

[11] Patent Number: 5,671,157
[45] Date of Patent: Sep. 23, 1997

[54] METHOD AND SYSTEM FOR DISPLAYING THREE DIMENSIONAL IMAGES

[75] Inventor: Kazuyo Saito, Tochigi-ken, Japan

[73] Assignee: Kabushiki Kaisha Toshiba, Kawasaki, Japan

[21] Appl. No.: 392,323

[22] Filed: Feb. 22, 1995

[30] Foreign Application Priority Data

Feb. 22, 1994 [JP] Japan ................... 6-024216

[51] Int. Cl.⁶ .................................. G06T 17/00
[52] U.S. Cl. .................. 364/514 R; 364/413.13; 364/413.18; 364/413.19; 364/413.22; 395/119; 395/123; 395/124; 395/125; 395/129; 395/152; 382/131; 382/285
[58] Field of Search .................... 395/119, 123–125, 395/129, 152; 364/514 R, 413.13, 413.18, 413.19, 413.22; 382/131, 285

[56] References Cited

U.S. PATENT DOCUMENTS

| 4,737,921 | 4/1988  | Goldwasser et al. | 364/518    |
| 4,766,556 | 8/1988  | Arakawa           | 395/124    |
| 4,809,065 | 2/1989  | Harris et al.     | 395/124    |
| 4,835,688 | 5/1989  | Kimura            | 364/413.22 |
| 4,879,652 | 11/1989 | Nowak             | 364/413.18 |
| 4,879,668 | 11/1989 | Cline et al.      | 395/124    |
| 5,046,108 | 9/1991  | Inoue et al.      | 395/124    |
| 5,079,699 | 1/1992  | Tuy et al.        | 364/413.22 |
| 5,150,427 | 9/1992  | Frazee et al.     | 382/48     |
| 5,229,935 | 7/1993  | Yamagishi et al.  | 364/413.22 |
| 5,297,043 | 3/1994  | Tuy et al.        | 395/127    |
| 5,309,356 | 5/1994  | Nishide et al.    | 364/413.19 |
| 5,402,337 | 3/1995  | Nishide           | 364/413.13 |

*Primary Examiner*—Emanuel T. Voeltz
*Assistant Examiner*—Hien Vo
*Attorney, Agent, or Firm*—Oblon, Spivak, McClelland, Maier & Neustadt, P.C.

[57] ABSTRACT

A system and a method for displaying a three dimensional image and also a method for displaying a three dimensional image by selecting a ROI on at least two selected reference images from the input images obtained by scanning a body. The method is characterized in that to use distance images based on the reference value along a periphery of a selected ROI on an image slice, an interpolated ROI is used on the interposed slice image.

18 Claims, 10 Drawing Sheets

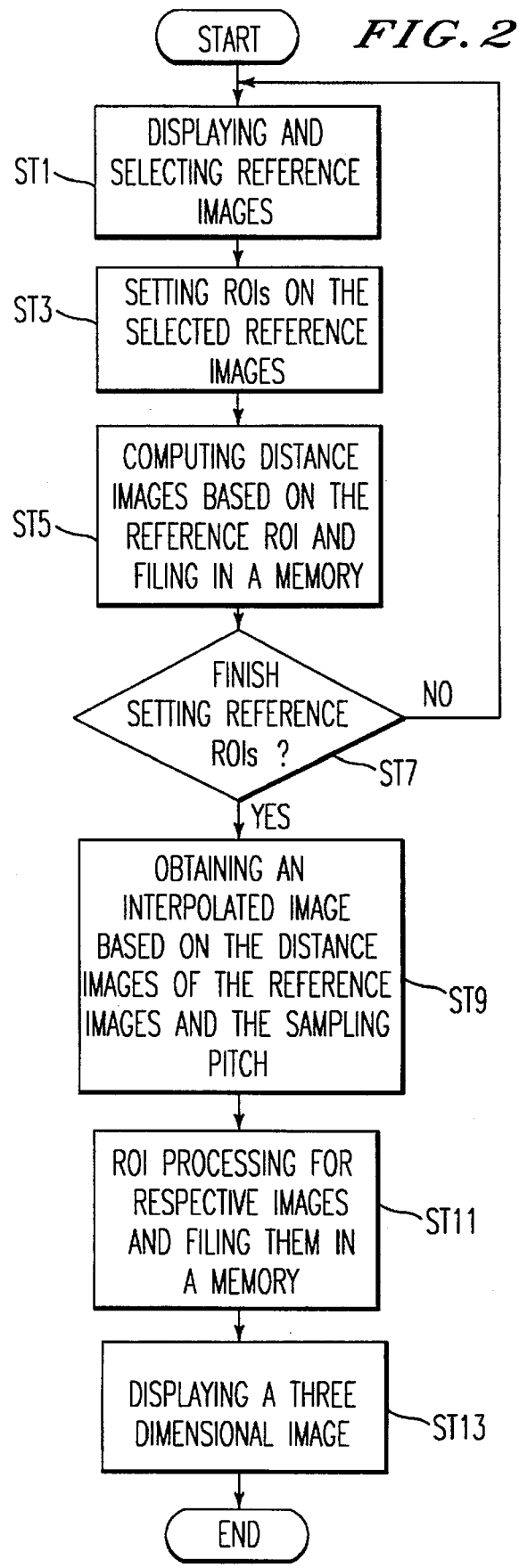

FIG. 3 (a) — DISTANCE IMAGE OF A SLICED IMAGE (n−1)

FIG. 3 (c) — INTERPOLATED IMAGE PRODUCED BY THE INPUT IMAGES OF THE SLICED IMAGES (n−1) and (n)

FIG. 3 (b) — DISTANCE IMAGE OF A SLICED IMAGE (n)

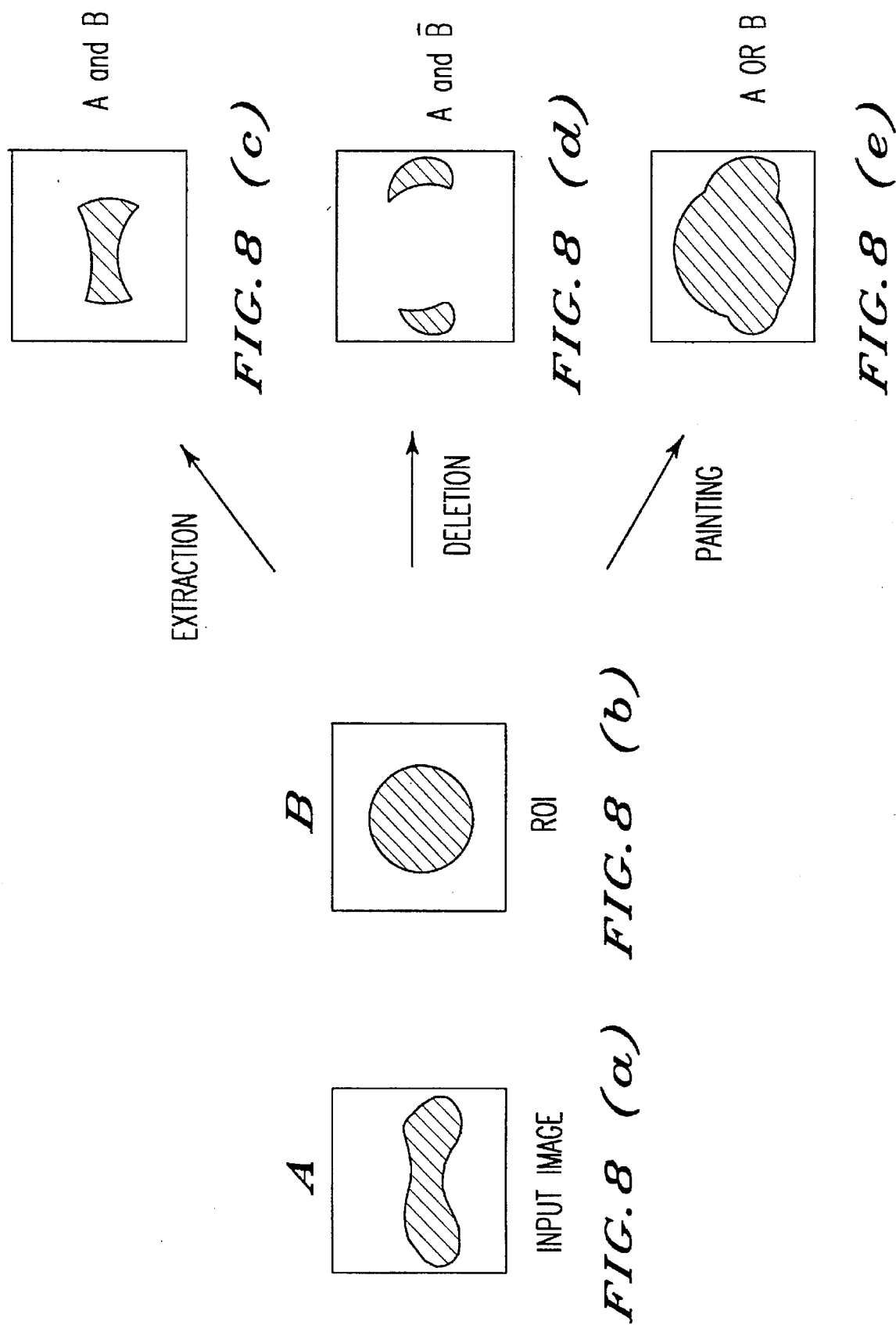

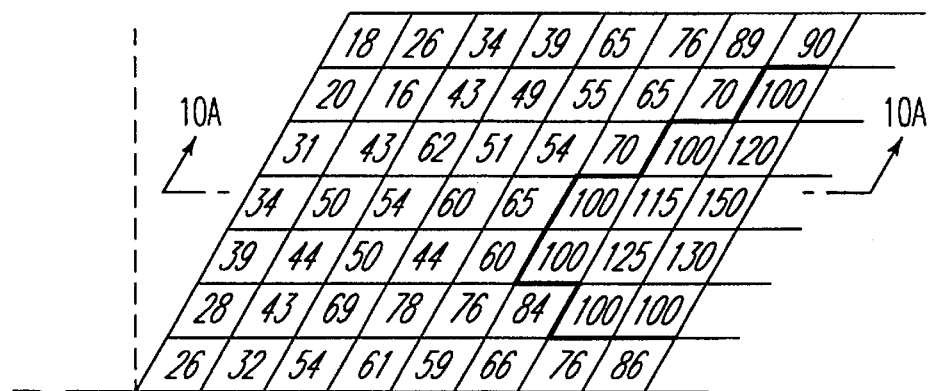
FIG. 9 (a) — INPUT IMAGE OF A SLICED IMAGE (n-1)
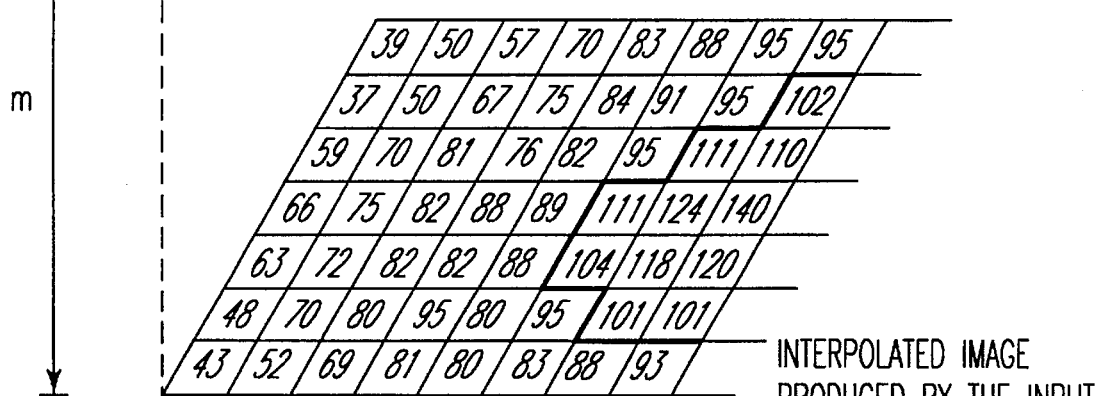
FIG. 9 (c) — INTERPOLATED IMAGE PRODUCED BY THE INPUT IMAGES OF THE SLICED IMAGES (n-1) and (n)
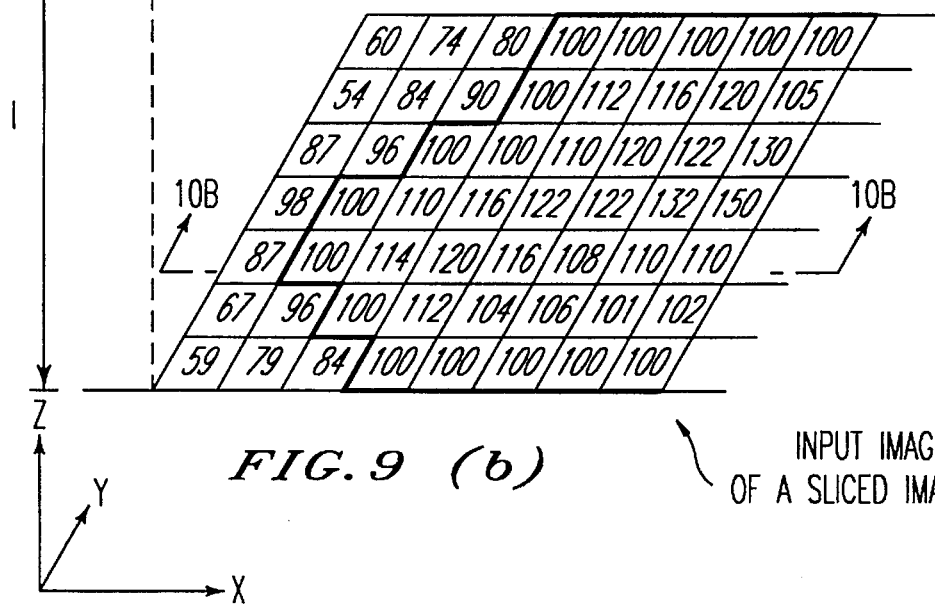
FIG. 9 (b) — INPUT IMAGE OF A SLICED IMAGE (n)
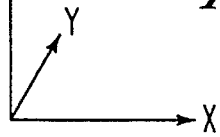

METHOD AND SYSTEM FOR DISPLAYING THREE DIMENSIONAL IMAGES

BACKGROUND OF THE INVENTION

1. Field of the Invention

This invention relates to a system for displaying a three dimensional image of a pertinent portion of a body or an article on a display for an image diagnosis.

More particularly, this invention relates to a system and a method for reproducing a three dimensional image of a pertinent portion by establishing a reference region of interest (hereinafter referred to as an "ROI" on at least two reference image slices which interpose at least one additional image slice.

More particularly, this invention relates to a system and a method for reproducing a three dimensional image of a pertinent portion on a display by setting an interpolated ROI on the additional image slice interposed by a linear interpolation of the reference ROIs.

Furthermore particularly, this invention relates to a system and a method for reproducing a three dimensional image by setting at least two reference ROIs and at least one interpolated ROI on each distance image of the image slices.

Furthermore particularly, the invention relates to a stereoscopic image display system and an image reproducing method thereof for avoiding a burdensome work of setting ROIs on all of the selected image slices by providing at least one interpolated ROI.

Furthermore, this invention relates to a system and a method for reproducing a three dimensional image on a display by using distance images of the reference image slices based on a reference value decided along a periphery of the established ROI on the respective reference slice image.

Still furthermore, this invention relates to a system and a method for displaying a three dimensional image on a display by processing a plurality of reference ROIs and at least one interpolated ROI on the respective distance images.

2. Discussion of the Background

A three dimensional image or a stereoscopic image is used both for a clinical use and an industrial use.

For example, a three dimensional image display of a human body surface, bone surfaces or some organ lesion portion are used for a clinical image diagnosis.

Further, a three dimensional image is used for finding defective portions in an industrial article.

For an image diagnosis, it needs to process a plurality of scanner input images to obtain a three dimensional image of a pertinent portion.

For example, it needs to subtract unnecessary portions for a diagnosis or to extract necessary portions for a diagnosis from a plurality input image slices.

Usually, an image scanner, like a computer tomography (hereinafter referred to as a "CT") or a magnetic resonance image (hereinafter referred to as a "MRI") is used to obtain a plurality of input image slices.

In order to reproduce a three dimensional image of a desired portion, usually a region of interest (ROI) is established on each of the input slice images.

Such a ROI setting work on all of the input slice images is made by using an input means, like a mouse device or a keyboard. However such a ROI setting work is extremely burdensome and is also a time consuming activity.

For example, in case of a diagnosis for a bone surface or a diagnosis before a surgical operation, it needs to obtain more than a hundred input slice images. Consequently, it becomes burdensome and time consuming work for setting a ROI on all of them.

In order to improve this burdensome work of ROI setting, it is considered to use an interpolated ROI image which is produced by calculation.

However, when an interpolation, is made by directly using images of scanner's input values, an interpolated image receives a severe influence from the sharp difference among the scanner's values for the respective picture elements of an image.

Such a big difference between neighboring picture elements causes reproduction of a three dimensional image having a big difference in level, since an interpolated image overlaps on a reference image including a big difference among neighboring picture elements.

Such a big difference appears, in particular, at a boundary area between a skin flesh and a bone as a defect of a reproduced image.

SUMMARY OF THE INVENTION

Accordingly, it is an object of this invention to provide a system and a method for displaying a three dimensional image on a display quickly.

It is another of this invention to provide a system and a method for display a three dimensional image which eliminates a sharp difference.

It is further object of this invention to provide a system for displaying a three dimensional image of a pertinent portion of a body or an article on a display for an image diagnosis.

It is still another object of this invention to provide a system and a method for reproducing a three dimensional image of a pertinent portion by setting a reference ROI on at least two reference slice images which interpose at least one additional slice images.

It is a still further object of this invention to provide to a system and a method for reproducing a three dimensional image of a pertinent portion on a display by setting an interpolated ROI on the additional slice image interposed by a linear interpolation of the reference ROIs.

It is still another object of this invention to provide a system and a method for reproducing a three dimensional image by setting at least two reference ROIs and at least one interpolated ROI on each distance images of the slice images.

It is still another object of this invention to provide a stereoscopic image display system and an image reproducing method thereof for avoiding a burdensome work of setting ROIs.

It is still further object of this invention to provide a system and a method for reproducing a three dimensional image on a display by using distance images of the reference slice images based on a reference value decided along a periphery of the selected ROI on the respective reference slice images.

It is a still further object of this invention to provide a system and a method for displaying a three dimensional image on a display by processing a plurality of reference ROIs and at least one interpolated ROI on the respective distance images.

These and other objects are achieved according to the present invention by providing a system for displaying a three dimensional image where the system comprises a display, an image memory for storing a plurality of slice images, each of said slice images including a plurality of picture elements, a display selection means for selectively displaying at least two reference images between which is interposed at least one additional image reference ROI setting means for setting at least one reference ROI on said reference images and for deciding reference values of said picture elements along a periphery of said reference ROI, distance image computing means for calculating distance values for said respective picture elements of said reference images based on said reference values of said reference ROI and values of picture elements of a corresponding reference image, ROI interpolation means for providing an interpolated ROI on said additional image, means for computing an interpolated image based on said interpolated ROI and said distance images, and three dimensional image processing means for displaying a three dimensional image on said display based on said distance and interpolated images.

Further, these objects are achieved by providing a method for displaying a three dimensional image, wherein the method includes the steps of selectively displaying a plurality of reference images having a sampling pitch on a display, setting a reference ROI on a selected one of said respective reference images, identifying a portion of interest of said reference images relative to said reference ROI, computing respective distance images based on said reference ROIs and said reference images, computing an interpolated ROI based on said distance images and said sampling pitch, computing an interpolated image based on said interpolated ROI and said distance images, and displaying a three dimensional image on said display based on said distance images and said interpolated image.

BRIEF DESCRIPTION OF THE DRAWINGS

FIG. 2 illustrates steps performed by a three dimensional image displaying system using one preferable method of the present invention;

FIGS. 3(a) to 3(c) show an interpolation of a distance image between two reference slice images;

FIGS. 8(a) to 8(e) illustrate results of image processings using extraction, deletion and painting;

FIGS. 9(a) to 9(c) illustrate a direct interpolation of an image between two input slice images by using projection values from a scanner;

DETAILED DESCRIPTION OF THE PREFERRED EMBODIMENT

Figure 1:
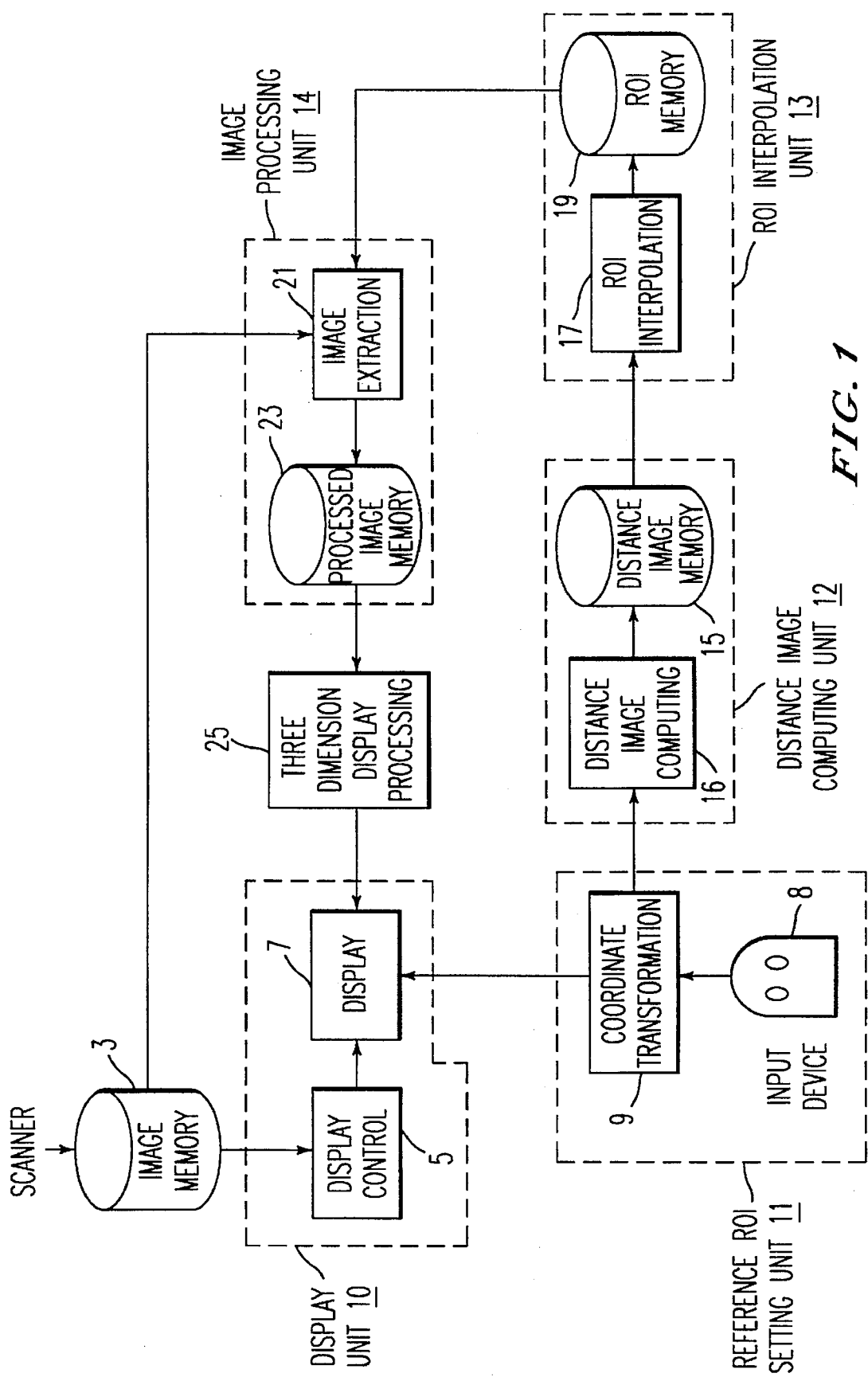
FIG. 1 shows a schematic diagram of a three dimensional image displaying system using one preferable method of the present invention.

As shown in FIG. 1, a three dimensional image displaying system 1 according to the present invention includes an image memory 3, a display unit 10, a reference ROI establishing unit 11, a distance image computing unit 12, an ROI interpolation unit 13 and an image processing unit 14. The memory 3 stores data of input slice images acquired by a scanner.

The display unit 10 includes a display control means 5 and a display 7 of, for example, a cathode ray tube or a liquid crystal.

The display unit 10 further includes an input means for selectively displaying a plurality of the input slice images on the display 7.

The reference ROI selecting unit 11 includes an ROI input device 8, like a mouse device, and a coordinate transformation means 9 for deciding the coordinates of the respective picture elements of a selected image slice on the display 7.

The distance image computing unit 12 includes a distance image calculation means 13 for calculating a distance image for the respective selected images based on a reference value which correspond to the coordinate of the reference ROI.

The distance image computing unit 12 further includes a distance image memory means 15 for filing the calculated distance image values of respective slice images.

The ROI interpolation unit 13 includes a ROI interpolation means 17 for computing an interpolated ROI for the additional slice images which are interposed by the reference slice image on which the reference ROI setted.

The ROI interpolation means 17 calculates an interpolated image based on the interpolated ROI and the distance images.

The interpolated ROIs are filed in a ROI memory 19.

The image processing unit 14 includes an image processing means 21 for processing the reference ROIs on the reference image slices and the interpolated ROIs on the interposed image slices.

The data processed by the processing 21 are filed in an image memory 23.

A three dimensional image display processing means 25 constructs a three dimensional (3D)image by registering the processed images for display on the display 7.

The image memory means 3 stores a plurality of input slice images from an image scanner, like a CT or a MRI, in accordance with the projection value which corresponds to a respective picture elements of an input slice image.

The display control means 5 quantizes the respective picture elements of slice images in the image memory means 3 binary images to be displayed on a display 7.

Further the display control means controls a display condition of a display, like an image gradation and so on.

The display 7 comprises for example, a cathode ray tube or a liquid crystal. Further the display 7 includes an input apparatus, like a keyboard for selecting a plurality of images to be displayed from the slice images stored in the image memory 3.

The reference ROI setting unit 11 has an input device, like a mouse, for setting a reference ROI on each of the selected input slice images for defining a portion of interest of the reference images.

The reference ROI setting unit 11 further includes a coordinate transformation means 9 for calculating the coordinate of the reference ROI by the amount of the mouse movement.

For the system according to the present invention, at least two reference slice images must be selected. And at least one additional slice image must be interposed between the reference input slice images for providing an interpolated ROI on the interposed slice image.

The coordinate transformation means 9 decides a coordinate for the picture elements positioned along a periphery of the selected reference ROI based on an amount of a movement of an input device 8.

The reference ROI is usually selected as a closed loop.

The distance image computing means 13 computes reference values for all of the picture elements.

The value of the picture elements along a periphery of the selected reference ROI is decided as a reference value which corresponds to the reference coordinate.

In the case of the CT values of the picture elements that increase toward the inside of the selected ROI, the values for the picture elements located within the reference ROI are determined by adding a value, for example "1", to the reference value along the periphery of the reference ROI such that a value increases for each picture element in the inward direction.

On the contrary, in the case of the CT values of the picture elements that decrease toward an outside of the set ROI, the values for the picture elements located outside of the reference ROI are decided by subtracting a value from the reference value of the reference ROI as progress towards the outside is made on a per picture element basis.

As an example, the values of the respective picture elements located inside of a periphery of the closed looped ROI are decided by adding or subtracting 1 by 1 to or from the reference value, for example 100, of the picture elements of the reference ROI outline with progress to the inside or outside of the outline of ROI with progress inside or outside to a picture element to a neighboring picture element.

Such calculation is made for all picture elements of an input slice image for providing a distance image. To provide the distance image before interpolation is a characteristic feature of this invention.

The ROI interpolation means 17 produces an interpolated ROI on an additional image slice interposed between the reference ROI selected image slices of the distance image.

A distance image memory 15 stores a plurality of the calculated distance images.

FIGS. 3(a) and 3(b) explain the abovementioned feature of deciding a distance image.

FIG. 3(a) is a distance image of a selected reference input image slice(n-1) and FIG. 3(b) is a distance image of a selected reference input image slice(n).

In this example, the picture elements of a CT value "100" are used for the reference value of the reference ROI and the values for the respective picture elements located inside of the selected reference ROI are decided by adding "1" to the reference value "100" with progress to inside by every picture element to the inside.

Further the values for the respective picture elements located at an outside of the reference ROI are decided by subtracting "1" from the reference value "100" with progress to the outside by every picture element.

FIGS. 3(a) and 3(b) are distance images of the reference image slices.

For understanding the difference between the CT value images and the distance images, FIGS. 9(a) and 9(b) illustrate an example.

In FIGS. 9(a) and 9(b), a plurality of CT projection values are directly used as a pixel of a picture element of an input slice image.

As shown in FIGS. 9(a) and 9(b), the CT projection values on an input image slice include a bib difference among the picture elements.

This large difference among the picture elements creates a problem for producing an interpolated images as shown in FIG. 9(c).

FIG. 9(c) is an interpolated image produced by the interpolation of the two reference input images slices (n-1) and (n) shown in FIGS. 9(a) and 9(b), respectively.

Since the big difference among the respective CT values in the image slice(n-1) affords the interpolated value, the reproduced ROI on the interposed image has almost overlapped to the reference ROI setted on the image slice (n-1).

As a consequence, a reproduced three dimensional image appears a sharp difference in level between the reproductions of image slices (n-1) and n.

Such a sharp difference in a reproduced three dimensional image of a spheroid, like a skull, cannot reconstruct a smooth circular arc along the periphery of the spheroid, and it causes a misjudgement of a diagnosis.

Figure 10:
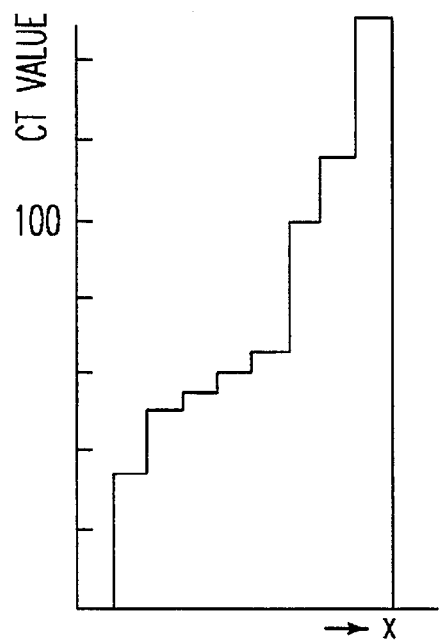
FIGS. 10(a) and 10(b) show CT values obtained along respective cut lines 10A and 10B in FIGS. 9(a) and 9(B)
Figure 10:
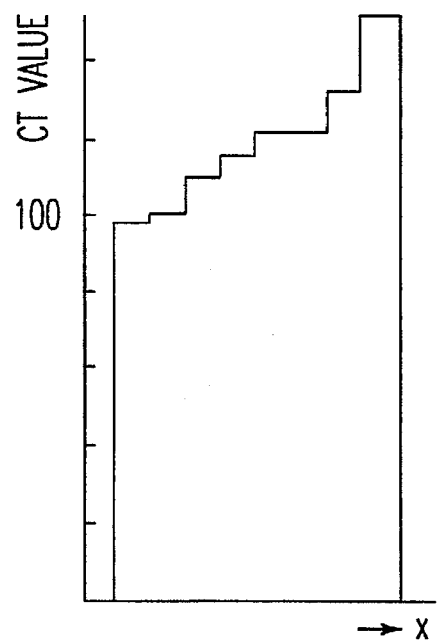

FIGS. 10(a) and 10(b) explain such a big difference between the CT value which are obtained by cutting along a dotted line 10A—10A and a dotted line 10B—10B in FIGS. 9(a) and 9(b), respectively.

On the contrary, the usage of distance images of input image slices can eliminate these defects as shown in FIG. 3(c).

In FIG. 3(c), an interpolated ROI is produced by an interpolation of the distance images of the two reference input image slices (n-1) and (n).

As explained before, the values for respective picture elements are determined so as to vary gradually inside or outside from a reference value along a periphery of the selected reference ROI.

Accordingly, as shown in FIG. 3(c), the interpolated ROI produced on the interposed image slice is slightly changing from both of the reference image slices (n-1) and n.

Figure 4:
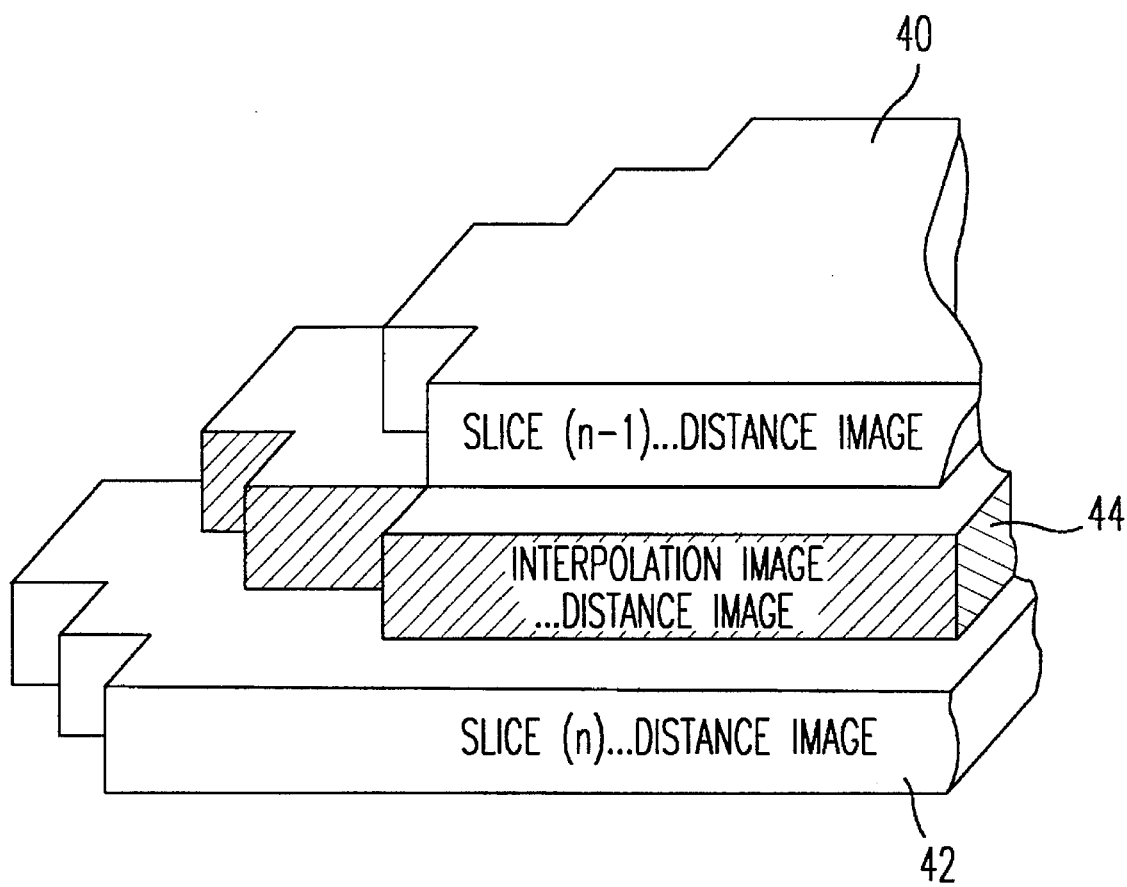
FIG. 4 illustrates a partial perspective view of a reproduced three dimensional image from the distant images shown in FIGS. 3(a) to 3(c)

As a result, the reproduced three dimensional image shows the interpolated image portion clearly between the reproduced images of the reference image slices (n-1) and n as shown in FIG. 4, since the grade differences among the slice images are relatively small, it becomes possible to reproduce a peripheral image of a spheroid, like a skull, as a smooth circular arc.

Figure 11:
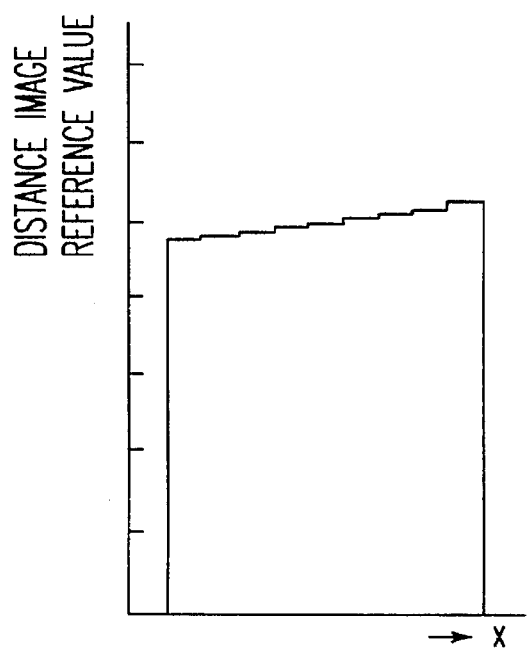
FIGS. 11(a) and 11(b) show distance image reference values obtained along respective cut lines 10A and 10B in FIGS. 9(a) and 9(B).
Figure 11:
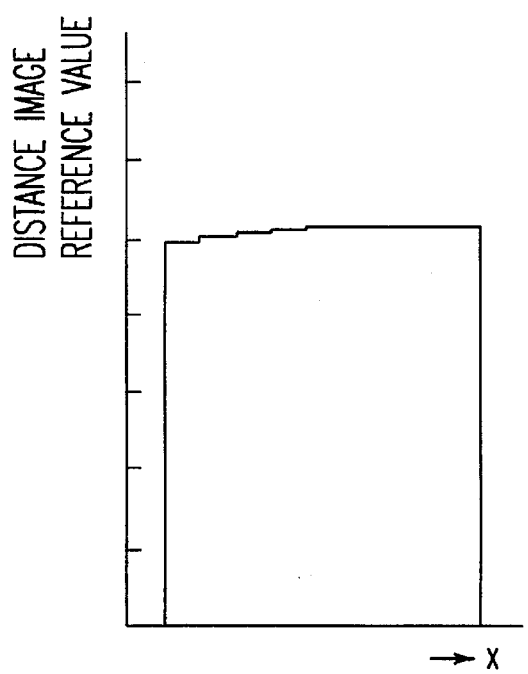

FIGS. 11(a) and 11(b) show the gradually changes of the distance images for the respective picture elements in FIGS. 3(a) and 3(b) which are cut along the dotted lines 11A—11A and 11B—11B, respectively.

As shown in FIGS. 11(a) and 11(b), moderate differences or a gradual change of the distance images are useful for a reproduction of a three dimensional image.

The distance image of the interpolated ROI is decided by a linear interpolation based on the sampling pitches "l" and "m" of the interposed slice image and the coordinate of the reference ROI.

In FIGS. 3(a) to 3(c), the interpolated image is provided by using the following equation [1]:

$$T(x,y) = \{m \cdot n(x,y) + l \cdot n-1(x,y)\}/(l+m) \quad [1]$$

where: T(x,y) is a pixel magnitude of the interpolated image at the coordinate (x,y);

n(x,y) is a reference value of a reference image n at the coordinate (x,y); and n-1(x,y) is the reference value of a reference image n-1 at the coordinate (x,y).

When the interpolation image is provided at the middle position of the two reference input image slices (n-1) and n, that is, when the pitch l=m along the Z-axis, the equation [1] can be simplified as the following [2].

$$T(x,y)=\{n(x,y)+n-1(x,y)\}/2 \qquad [2]$$

In this case, the interpolated distance values on the interposed image slice take mean values of the distance values of the two reference image slices(n-1) and n.

Now turning to FIG. 1, the ROI interpolation unit calculates an interpolated ROI based on the pitch of the interposed image and the coordinate of the distance image of the two reference input image slices as explained above.

The ROI memory 19 stores the reference ROIs and the interpolated ROIs for the respective slice images.

The image processing unit 14 includes an image processing means 21 for processing a ROI and an input image.

In this embodiment in FIG. 1, the image memory 3, the distance image memory 15, the ROI memory 19 and the processed image memory 23 are respectively shown as independent video memories.

However, it is possible to construct these memories as a single video memory or as a number of commonly used video memories.

Now refering to the flow chart of FIG. 2 and FIGS. 5(a) to 5(e), a method for displaying a three dimensional image on a display is described.

The method for displaying a three dimensional image according to the present invention is comprised of the following steps of: selectively displaying a plurality of reference images having a sampling pitch on a display, setting a reference ROI on a selected one of said respective reference images, identifying a portion of interest of said reference images relative to said reference ROI, computing respective distance images based on said reference ROIs and said reference images, computing an interpolated ROI based on said distance images and said sampling pitch, computing an interpolated image based on said interpolated ROI and said distance images, and displaying a three dimensional image on said display based on said distance images and said interpolated image.

FIG. 2 explains the above process briefly.

Figure 5:
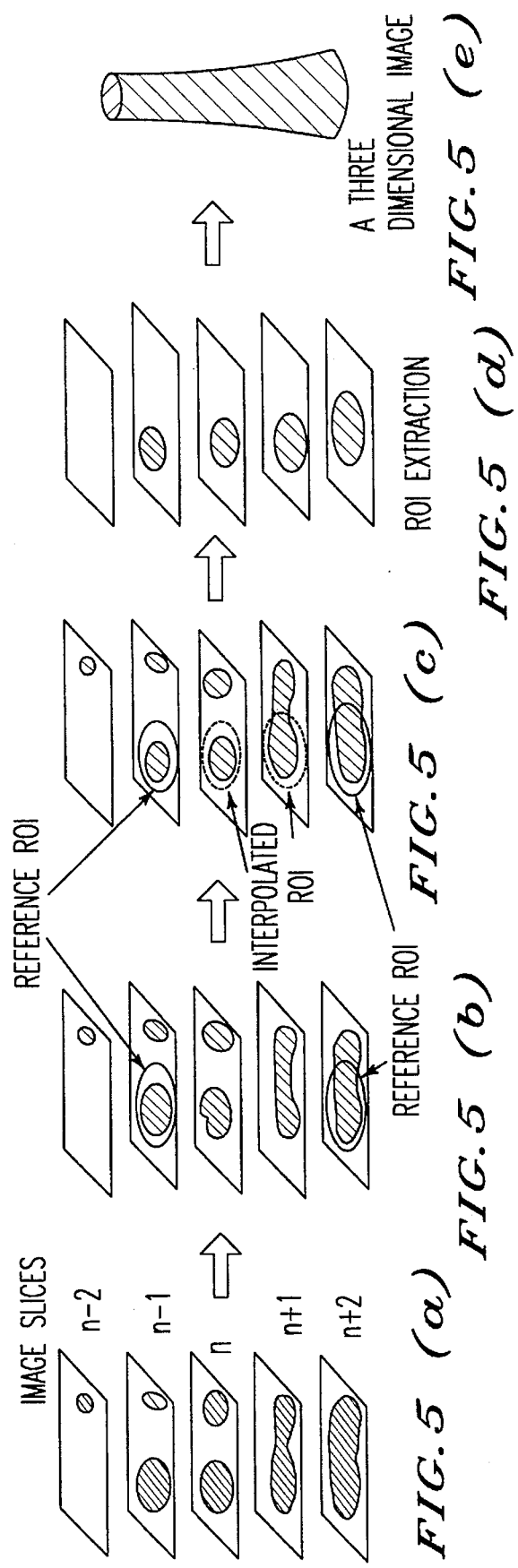
FIGS. 5(a) to 5(e) illustrate steps for reproducing a three dimensional image.

FIG. 5(a) shows a selection step of a plurality of input image slices (n+2),(n+1), n, (n-1), (n-2).

FIG. 5(b) shows a reference ROI selecting step on the selected reference image slices (n+2) and (n-1), respectively. The reference ROI is indicated by a solid line.

FIG. 5(c) shows a step for producing an interpolated ROI on the interposed image slices (n+1) and n, respectively. The dotted circle indicates an interpolated ROI.

FIG. 5(d) is a step for the ROI processing of extraction.

Figure 6:
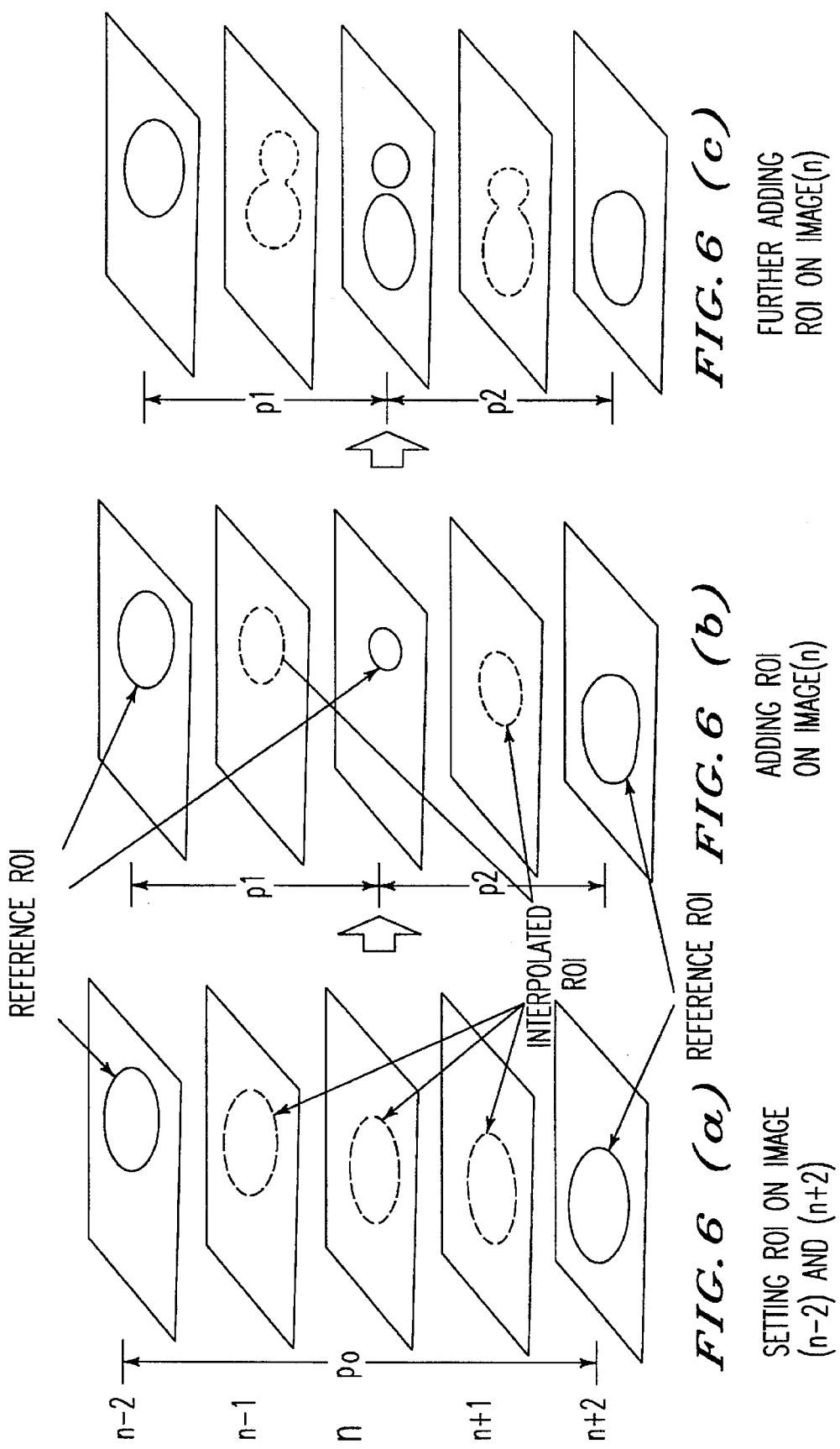
FIGS. 6(a) to 6(c) illustrate various ROI interpolations by using two reference ROIs.

FIG. 6(e) is a step for reproducing a three dimensional (3D) image by superposition of the extracted ROIs.

FIGS. 7(a) to 7(c) and FIGS. 8(a) to 8(e) explain several kinds of image processing methods.

Figure 7:
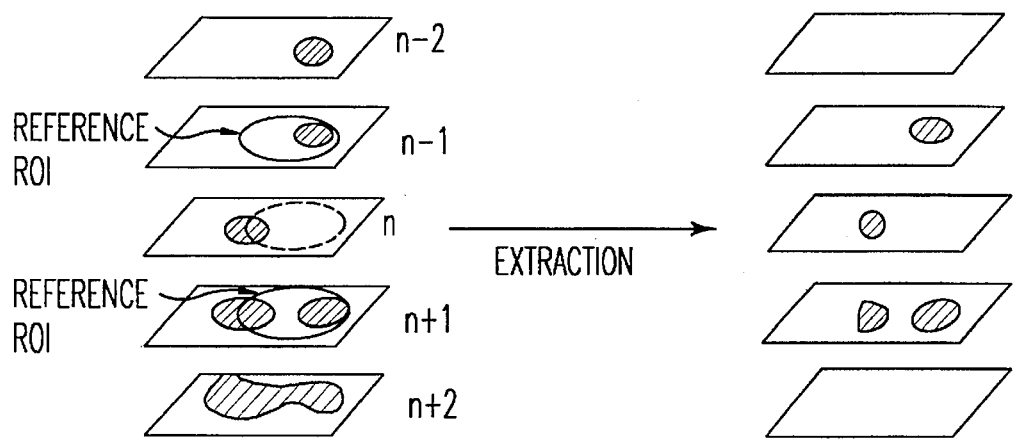
FIG. 7(a) illustrates an image processing using extraction.
FIG. 7(b) illustrates an image processing using deletion.
FIG. 7(c) illustrates an image processing using painting.
Figure 7:
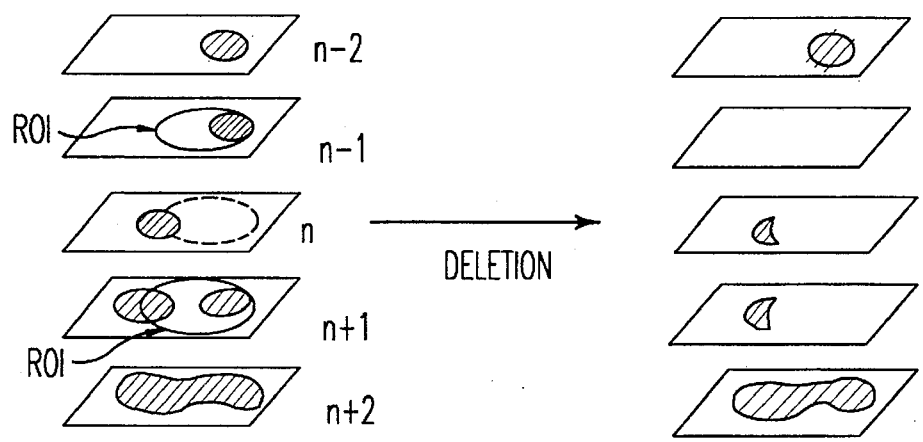
Figure 7:
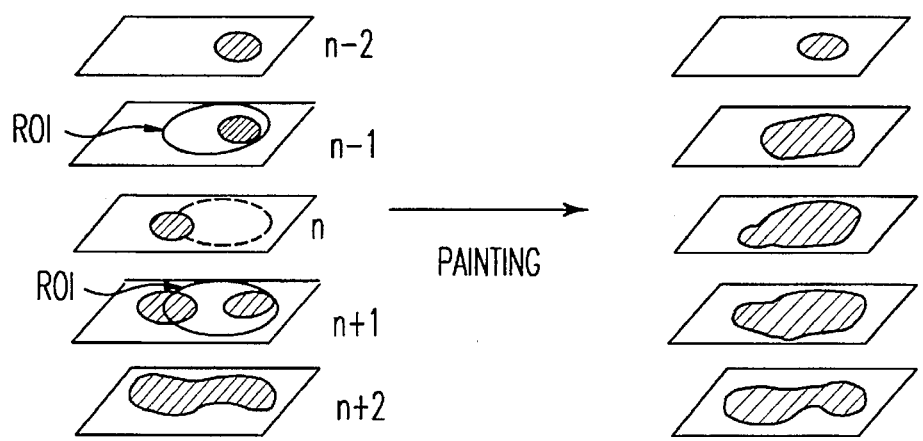

FIGS. 7(a) and 8(c) explain an extraction image processing operation.

FIGS. 7(b) and 8(d) depict a subtraction/deletion image processing operation.

FIGS. 7(c) and 8(e) show how both an input image slice and a reference ROI portion are painted.

In FIGS. 7(a) to 7(c), a reference ROI is provided on the input image slices (n-1) and (n+1) which interpose an image slice n.

As shown in FIGS. 8(a), 8(b) and 8(c), an extraction is made by an addition of an input image slice A and a ROI set image surface B, that is a logical addition of A AND B.

FIGS. 8(a), 8(b) and 8(d), explain a logical subtraction/deletion operation between the input image slice A and the ROI set image slice B, that is a logical addition of A AND (NOT B).

FIGS. 8(a), 8(b) and 8(e) explain a painting operation of image A and the ROI image B, that is a logical OR, i.e., A OR B.

The processed images are stored in a processed image memory 23.

The three dimensional image display processing means 25 produces a three dimensional display by super-positioning a plurality of processed images stored in the memory 23 and controls displaying such a pre-produced image on the display 7.

The embodiment of the present invention is mentioned as to a linear interpolation. It is also possible to apply a non-linear interpolation, if it is required. For example, in case of a skull, it may be better to interpolate by applying some other function.

As explained above, the invention provides a system and a method for displaying a three dimensional image of a pertinent portion much more quickly and clearly by using at least two reference ROI selected input slice images that interpose at least one additional input slice image and also by using distance images for the respective slice images.

What is claimed is:

1. A system for displaying a three dimensional image, the system comprising:

a display;

an image memory for storing a plurality of slice images, each of said slice images are successively arranged;

a reference image selection means for selecting at least two reference images between which is interposed at least one additional image;

reference ROI selecting means for selecting at least one reference ROI on each of said at least two reference images; and additional ROI decision means for selecting an additional ROI of the interposed additional image based on both the sizes of said references ROI selected on each of said reference images and a distance between one of said at least two reference images and said at least one additional image.

2. The system as claimed in claim 1, further comprising:

three dimensional image processing means for displaying a three dimensional image on said display based on said images which define the reference and the interpolated ROI.

3. The system for displaying a three dimensional image as claimed in claim 1, further comprising:

distance image computing means for calculating distance values for said respective picture elements of said images based on said reference values of said reference ROI and values of picture elements of a corresponding reference image.

4. The system for displaying a three dimensional image as claimed in claim 1, wherein said reference ROI selecting means inputs a closed loop reference ROI on at least one of said at least two reference images and including means for deciding reference values for picture elements along a periphery of said at least one reference ROI, the system further comprising:

distance image computing means for deciding reference values for said respective picture elements located outside of said closer loop ROI based on said reference values of said at least one reference ROI and the values of picture elements of a corresponding one of said at least two reference images, an image processing means for subtracting said picture elements located outside of said at least one ROI on said respective slice images, and a three dimensional image processing means for superimposing a plurality of extracted images for constructing a three dimensional image.

5. The system for displaying a three dimensional image as claimed in claim 1, further comprising ROI interpolation means for providing an interpolated ROI on said at least one additional image which is interposed between said at least two reference images, wherein said reference ROI setting means inputs a reference ROI on each of said at least two reference images and includes means for deciding reference values for picture elements along a periphery of said at least one reference ROI, the system further comprising distance image computing means including means for deciding reference values for said respective picture elements located outside of said at least one reference ROI by subtracting a value from said reference values of said at least one reference ROI.

6. The system for displaying a three-dimensional image as claimed in claim 1, further comprising ROI interpolation means including means for providing a linearly interpolated ROI on said at least one additional image.

7. The system for displaying a three dimensional image as claimed in claim 1, wherein said reference ROI selecting means includes a mouse device for providing a closed loop of said at least one ROI and a coordinate transformation means for deciding a coordinate for said respective picture elements corresponding to an outline of said at least one reference ROI by an amount of movement of said mouse device.

8. The system for displaying a three dimensional image as claimed in claim 7, further comprising distance image computing means for computing a reference value for a respective picture element along said outline of said at least one reference ROI based on a scanner projection value.

9. The system for displaying a three dimensional image as claimed in claim 1, wherein said reference ROI selecting means inputs a closed loop reference ROI on said at least two reference images, the system further comprising:

distance image computing means for computing a respective distance value of the respective picture elements located inside of said closed loop reference ROI, image processing means for painting both of said at least one additional image and an inside of said additional ROI, and three dimensional image processing means for superimposing extracted ROIs for constructing a three dimensional image.

10. A system for displaying a three dimensional image of claim 6, wherein said means for providing a linearly interpolated ROI on said at least one additional image uses the following equation:

$$T(x,y)=\{m \cdot n(x,y)+1 \cdot n-1(x,y)\}/(1+m)$$

where: T(x,y) is a pixel magnitude of the interpolated image at the coordinate (x,y);

n(x,y) is a reference value of a reference image n at the coordinate (x,y); and n−1(x,y) is the reference value of a reference image n−1 at the coordinate (x,y).

11. A method for displaying a three dimensional image, the method comprising the steps of:

selectively displaying on a display at least two reference images between which is interposed at least one additional image;

selecting at least one reference ROI on each of said at least two reference images;

selecting an additional ROI of the interposed additional image based on both the sizes of said references ROI selected on each of said reference images and a distance between one of said at least two reference images and said at least one additional image.

12. A method for displaying a three dimensional image according to claim 11, wherein said step of selecting at least one reference ROI on each of said at least two reference images comprises the steps of inputting a closed loop ROI and deciding a reference value for picture elements along a periphery of said at least one reference ROI.

13. A method for displaying a three dimensional image according to claim 11, further comprising the step of computing an interpolated ROI using linear interpolation based on distance images and a sampling pitch.

14. A method for displaying a three dimensional image according to claim 12, further comprising the step of computing respective distance images by deciding reference values for respective picture elements within a closed loop ROI based on said reference values of said at least one reference ROI and values of picture elements of a corresponding one of said at least two reference images.

15. A method for displaying a three dimensional image according to claim 11, further comprising the step of computing respective distance images by deciding distance values for respective picture elements located outside of said closed loop ROI based on reference values of said at least one reference ROI and values of picture elements of a corresponding one of said at least two reference images.

16. A method for displaying a three dimensional image according to claim 13, further comprising the step of computing an interpolated ROI on said at least one additional image using the following equation:

$$T(x,y)=\{m \cdot n(x,y)+1 \cdot n-1(x,y)\}/(1+m)$$

where: T(x,y) is a pixel magnitude of the interpolated image at the coordinate (x,y);

n(x,y) is a reference value of a reference image n at the coordinate (x,y); and n−1(x,y) is the reference value of a reference image n−1 at the coordinate (x,y).

17. The method as claimed in claim 11, further comprising the step of displaying a three dimensional image on said display based on said images which define the reference and the interpolated ROI.

18. A method for displaying a three dimensional image, the method comprising the steps of:

displaying on a display at least two reference images having a sampling pitch and between which is the interposed at least one additional image, selecting a reference ROI on said at least two reference images, and selecting an additional ROI of the interposed additional image based on both the sizes of said references ROI selected on each of said reference images and a distance between one of said at least two reference images and said at least one additional image.

* * * * *